Aug. 6, 1968  N. A. SINCLAIR  3,395,572
APPARATUS FOR ULTRASONIC DETECTION AND DISPLAY
OF LOCATION OF MATERIAL DEFECTS
Filed Feb. 5, 1965

INVENTOR
NEIL A. SINCLAIR

BY  Robert B. Harmon

ATTORNEY

United States Patent Office 3,395,572
Patented Aug. 6, 1968

3,395,572
APPARATUS FOR ULTRASONIC DETECTION
AND DISPLAY OF LOCATION OF MATERIAL
DEFECTS
Neil A. Sinclair, Gales Ferry, Conn., assignor to General
Dynamics Corporation, New York, N.Y., a corporation
of Delaware
Filed Feb. 5, 1965, Ser. No. 430,666
6 Claims. (Cl. 73—67.8)

ABSTRACT OF THE DISCLOSURE

Apparatus for determining the location and dimension of defects in solid bodies by ultrasonic inspection, in which an ultrasonic beam is transmitted in the solid body to set up one or more ultrasonic reflections which occur when the beam intercepts a defect and which are received by a sensor to produce a sharp deflection in the base line trace of a display apparatus. A second trace is initiated in timed relation to the transmission of the ultrasonic beam into the test body, having a slope corresponding to the angle of the beam in the body and intersecting the deflection in the base line trace upon reception of a reflection caused by the defect. A template bearing an outline of the shape of the body under test and positioned over the face of the display apparatus facilitates precise location of the defect relative to the test body itself, observing the intersection of the sharp base line trace deflection and the second trace corresponding to the beam angle.

Disclosure

This invention relates generally to flaw indicators in general, and more particularly to a method and apparatus for facilitating an accurate determination and display of the location of defects revealed by shear-wave, or angle beam, pulse-echo ultrasonic inspection techniques when applied to solid bodies.

Pulse-echo ultrasonic inspection systems employed to detect the presence of material defects in solid bodies are well known in the art. In the application of these techniques, a short train of high-frequency ultrasonic vibrations together with the travel time required for such vibrations to propagate from a given surface of an inspected specimen to an internal reflecting fault in the specimen are generally employed to determine the location of the fault.

It is also well known to employ a visual display screen, such as a cathode ray tube, in devices utilizing the above-stated inspection techniques to measure the travel time of the vibrational waves. Such prior art devices have utilized variable frequency square waves applied to one of the vertical deflection plates of the cathode ray tube to identify increments of time as an electron beam sweeps across the face of the tube. These square-wave time marks are satisfactorily employed when the vibrational waves are propagated in a direction at right angles to the face of a frequency transmitter, or ultrasonic transducer probe. Thus, by the foregoing application, a unit of time corresponds to a unit of lineal dimension within the inspected specimen. Furthermore, a calibrated distance scale may be provided on the display surface of the cathode ray tube to enable a direct determination of the distance from the ultrasonic transducer to the defect.

When inspecting flat plate members, or weldments joining abutting plate members, it is known in the art to employ vibrational shear waves, or angle beams, rather than longitudinal, or right angle, vibrational waves. These shear waves propagate by internal deflections within an inspected specimen. As illustrated in U.S. Patent No. 3,115,771 granted Dec. 31, 1963, to E. A. Henry, a sawtooth, marker sweep may be employed to represent the deflection path of an ultrasonic wave as it progresses through abutting flat plate members and their connecting weld joint. Although the true depth of a defect signal may be represented in this manner along the marker-sweep path on a cathode ray tube display surface, the distance between the ultrasonic probe and the defect cannot be determined directly by such prior art devices. Thus, the distance between the ultrasonic probe and defect must be determined by other means, such as an adjustable-ruler device, as illustrated in U.S. Patent No. 2,846,875 granted on Aug. 12, 1958, to W. Grabendorfer.

Consequently, on inspection of the prior art, it is apparent that a shear wave, ultrasonic inspection method, or system, which enables a direct determination and display of both depth and distance of a flaw within a body under test has not heretofore been satisfactorily devised.

It is therefore a primary object of this invention to provide a flaw detecting apparatus capable of presenting a visual indication of the location of a flaw with respect to a cross-sectional illustration of a test-piece.

A specific object of this invention is to provide an ultrasonic inspection system with a cathode ray tube viewing screen having a transparent template displaying a representative cross-sectional scale drawing of an actual test-piece mounted thereon to provide a comparative visual indication of the location of a flaw with respect to the test-piece.

An additional object of this invention is to provide means for illustrating on the screen of a cathode ray tube, the location of a flaw in a test-piece by depicting the point of intersection of a representation of an ultrasonic beam centerline with a representation of a peak amplitude defect signal on a cross-sectional sketch of the test-piece mounted on the screen.

It is a further object of this invention to provide a means for determining and displaying a flaw location in a specimen under test in terms of both the depth of the flaw below an ultrasonic angle-beam test probe and the distance of the flaw from the probe, as the probe is variably positioned within a given cross-sectional plane of the specimen and as the probe is variably positioned along the specimen in a plane perpendicular to the cross-sectional plane.

With the foregoing and other objects in view, the invention resides in the following specification and claims, certain embodiments and details of construction of which are illustrated by the specification when considered with the accompanying drawings in which:

Figure 1:
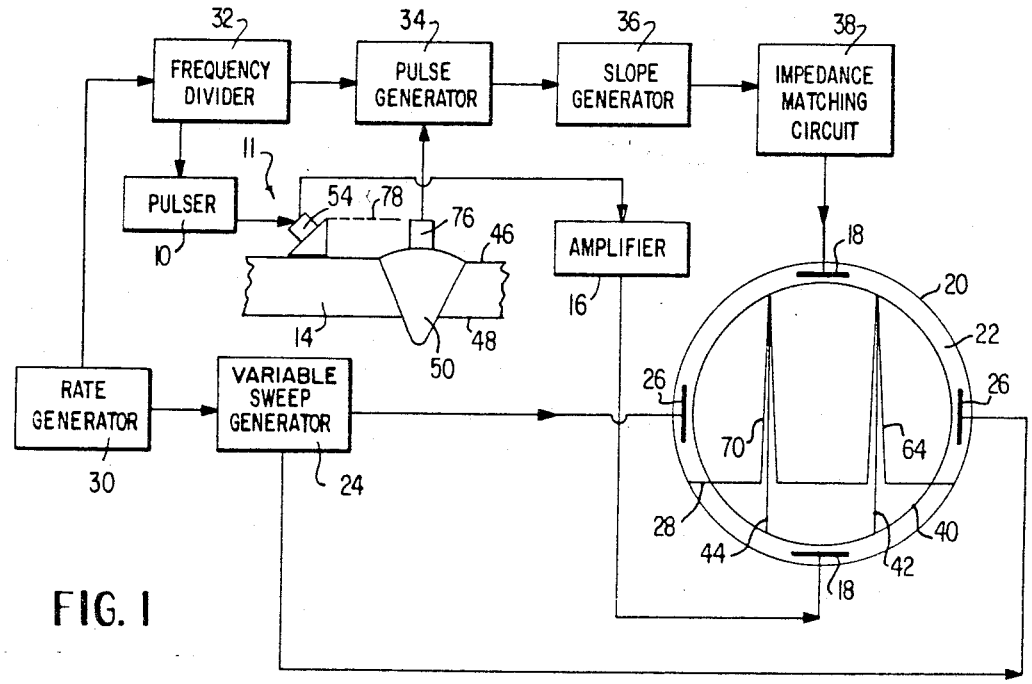
FIGURE 1 is a block diagram of the electronic components and the interacting mechanical linkages of an embodiment within the contemplation of the present invention, the components of FIGURE 1 being arranged to present an illustration of the relationship between ultrasonic wave propagation in a test body and the occurrence of signals derived from discontinuities within the test body.

Referring now more particularly to the drawings, there is illustrated in FIGURE 1 a diagrammatic representation of exemplary connections for electronic components including a display unit for an ultrasonic, pulse-echo inspection system. A pulser, or frequency generator, is generally represented at 10. Pulser 10 is suitably arranged to furnish a quick succession of high frequency electrical impulses to a sounding probe 11. Pulser 10 may consist of an electrical frequency generator. Probe 11 may comprise both a piezoelectric transducing element, which enables a conversion of electrical energy to mechanical energy and a wedge member, which enables the introduction of the mechanical energy into a test body 14. Electrical pulses received by probe 11 are also supplied through an amplifying means 16 to vertical deflecting plates 18 of a cathode ray tube 20 to produce a vertical signal on a viewing surface 22 of tube 20. A variable frequency signal derived from a sweep generator 24 is applied to horizontal deflecting plates 26 of tube 20. A variable sweep frequency signal derived from generator 24 enables the production of a base line trace 28 on surface 22. The sweep generator 24 and pulser 10 are actuated cyclically by any well known timing means, such as a rate generator, or clock device 30.

The cyclic clock signals produced by rate generator 30 are preferably applied to a frequency dividing means 32, such as an electronic multivibrator, prior to their application to pulser 10. In this manner, frequency dividing means 32 is provided to apportion the clock signals from timing means 30 into half cycles alternately applied to pulser 10 and to a pulse generator 34. An output signal from pulser generator 34 is applied to a slope generator 36. Preferably, an output signal from slope generator 36 is applied to an impedance matching unit 38 where it is amplified and subsequently applied to the vertical deflecting plates 18 of tube 20.

Figure 2:
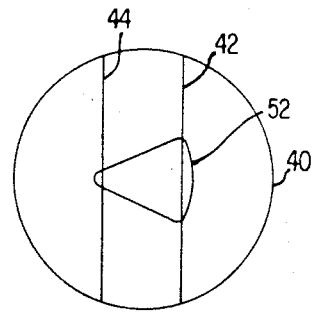
FIGURE 2 is a front view of a transparent template which may be positioned over a viewing surface, such as a cathode ray tube screen, in an ultrasonic inspection system.

FIGURE 2 illustrates a generally flat, preferably transparent, member 40 capable of being positioned over the viewing surface 22 of the cathode ray tube of FIGURE 1. Member 40 is provided with at least two parallel lines 42 and 44 suitably marker thereon in any acceptable manner. Line 42 may be representative of a top surface 46 of test body 14, while line 44 may be representative of the bottom surface 48 of the same body.

Although the above described device and the method of the present invention, as described hereinafter, has universal application to various types of workpieces, a specific application is herein presented with respect to the inspection of a butt weld 50, as shown in FIGURE 1. In the event that the ultrasonic inspection system of FIGURE 1 is employed to locate the presence of flaws in a weldment, an additional marking 52, positioned between the parallel lines on template member 40 of FIGURE 2, may also be provided to represent the cross sectional contour of the weldment under inspection. Although the shape of the cross sectional area of weld 50 and the shape of the corresponding marking on template 40 is represented as generally triangular, a weld having any general shape may be inspected. Thus, the location of a defect in a weld having any general cross-sectional shape may be visualized with respect to its actual shape by employing a template having a correspondingly shaped marking thereon.

Figure 3:
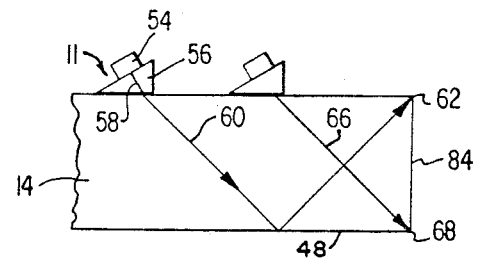
FIGURE 3 is a diagrammatic representation of ultrasonic wave propagation within a solid test body.

The components and display unit of FIGURE 1 are initially calibrated to correspond to the template as previously described with reference to FIGURE 2. Referring, therefore, to FIGURE 1 in conjunction with FIGURE 3, it will be observed that a transducing means 54 is shown mounted on a wedge member 56. Wedge 56 together with a suitable fluid coupling medium, positioned between the wedge and the surface of a test body 14, is provided to permit the refraction of a sound-energy beam 58 at a desired angle upon its entry into the test body. Upon introduction of beam 58 into body 14, refraction will occur and the resultant beam 60 will be deflected from surface 48 of the body. Probe 11 may be positioned to permit beam 60 to return to transducing means 54 by refection of beam 60 from a corner 62 formed by surface 46 at an end portion 84 of test body 14. Thus, upon reflection of beam 60 from corner 62, with template 40 positioned over surface 22 of tube 20, and by proper adjustment of the sweep delay of tube 20, the base line trace 28 may be adjusted to produce a spike indication 64 at line 42 on the template. After repositioning probe 11 and by proper adjustment of the sweep rate, tube 20 may be calibrated to produce a spike 770 at line 44 on template 40. Spike 70 is produced upon the occurrence of a signal resulting from the reflection of a beam 66 from a corner 68 formed by a back surface 48 and end portion 84 of body 14. The foregoing procedure establishes correct calibration of the apparatus by locating the position of the spikes 64, 70 and the spacing between them, to correspond to the upper and lower surfaces of the test body. The indication of a spike base line trace deflection intermediate the locations of the spikes 64 and 70 will therefore indicate a reflection of the ultrasonic beam from a point intermediate the upper and lower surfaces and at a distance from the template lines 42 and 44 proportional to the actual distance between the detected defect and the surfaces of the test body.

It should be remarked that the template 40 may be used for all test bodies having the same relative proportions, irrespective of the actual dimension of test piece. When the thickness of the test body is not that for which the apparatus was previously calibrated, it is only necessary to readjust the sweep delay and once more properly adjust the sweep rate of the generator 24 such that the spike deflections 64 and 70 again fall on the template lines 42 and 44. Alternatively, a test block of the same thickness as the inspected specimen may be employed to accomplish the foregoing calibration. Thus, by the aforestated method of calibration, lines 42 and 44 on template 40 may represent the top and bottom surfaces of a test body 14. The cathode ray tube sweep rate and sweep delay may be recalibrated for different plate thicknesses. Additionally, the screen grid on a cathode ray tube or a suitable divisional marking on the template may be employed for scaling the relative distance between lines 42 and 44 when template 40 is used with test bodies of varying thicknesses.

Figure 4:
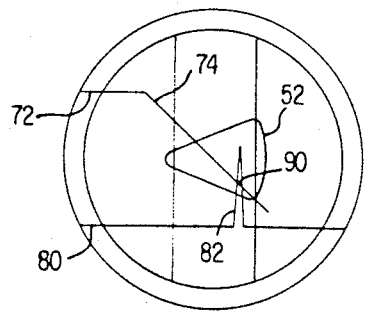
FIGURE 4 is a front view of a cathode ray screen with the transparent template of FIGURE 2 positioned thereon during an ultrasonic inspection process.

Referring now to FIGURE 4 in conjunction with FIGURE 1, the viewing surface 22 of tube 20 is illustrated with template 40 of FIGURE 2 positioned thereon. A movable beam-centerline trace is illustrated by an extension 74 of line 72. Line 74 corresponds pictorially to the position of an ultrasonic beam-center line produced within test piece 14. The beam-centerline trace is preferably produced by a deflection of the trailing edge of a square pulse of adjustable duration produced by pulse generator 34. Such deflection may be produced by slope generator 36. FIGURE 1 further illustrates a variable impedance means, or potentiometer, 76 positioned on weld 50 and connected by any suitable linkage means 78 to probe 11. Potentiometer 76, which may be excited from an external source (not shown) or, alternatively, constitute an internal element of the pulse generator 34, is connected to produce different voltage outputs for different probe positions. These varying voltage outputs are thus suitably fed into the inspection system to vary the position of the probe position trace 72 on screen 22 such that the true position of the beam centerline trace 74 may be shown with respect to the weld cross-sectional marking 52 on template 40.

The adjustable duration of the pulses produced by generator 34 is determined by the voltage derived from a variable resistance means 76 and thus the horizontal location of the probe position trace 72 is determined on screen 22. A base line, or reference trace, produced by sweep generator 24, is also represented in FIGURE 4 by line 80. By proper sweep rate and sweep delay calibration, both the beam position trace and the base line trace may be adjusted to correspond to the test body markings on template 40. When the beam centerline, representad by extension 74, strikes a discontinuity in weldment 50, the reflected signal from the discontinuity will be pictorially represented by a spike 82 appearing in base line trace 80. During maximum operation of the present invention, spike 82 achieves its peak amplitude when the beam centerline strikes the center of a discontinuity or material flaw.

By an additional preferment for the present invention, an alternating sequence produced by frequency dividing from sweep generator 24 is swept horizontally across the means 32 is employed to produce alternately both the spike 82 and the beam centerline trace 74. A first pulse lower portion of screen 22 to produce base-line trace 80. When a discontinuity is encountered, the base-line trace will be deflected vertically upward at a proportionate distance between lines 42 and 44 on template 40. Thus, the relative distance of a flaw from both surfaces of a test body may be determined by the relative position of spike 82 between lines 42 and 44. A successive pulse from sweep generator 24 is then swept horizontally across the upper portion of screen 22, and it is deflected vertically downward by beam position signals received from slope generator 36 and pulse generator 34.

As illustrated in FIGURE 4, a discontinuity in a solid test body is accurately indicated with respect to a cross-section being tested by the intersecting point 90 of spike 82 and beam centerline trace 74. Probe 11 may, therefore, be positioned to enable spike 82 to attain its peak amplitude. At peak amplitude the beam centerline strikes the center of the discontinuity.

Although the above described system may be employed to accomplish the exhibition and location methods of the present invention, it is recognized that other apparatus could be utilized to accomplish the same method. Consequently, any other transmitting means employed to control the position of a line of any type, representing an ultrasonic beam centerline as a function of a probe position, may be utilized. For example, a mechanical linkage, such as a wire, from the probe to an adjustable lineal indicator on the face of a display screen would accomplish the same objective. Similarly, a servo-motor system, coupling probe motion to the movement of a beam centerline indicator, might also be employed. Additionally, a dual-trace cathode ray tube may also be used instead of the frequency dividing means illustrated herein.

The invention may therefore be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A material testing system for determining the location of internal defects in solid test bodies comprising an electrical pulse producing means, an ultrasonic pulse-echo, shear-wave probe connected for energization by said pulse producing means and adaptable to engagement with a body under test to transmit an ultrasonic beam within the body at a non-orthogonal angle relative to the wave-entrant surface thereof, a cathode ray tube, first and second deflecting means and a viewing screen included in the cathode ray tube, electrical frequency generating means connected to the first deflecting means, timing pulse generating means connected to actuate said frequency generating means in synchronism therewith to establish a sweep frequency for an electron beam in said cathode ray tube and produce a base line trace on the screen, means coupling the probe to the second deflecting means to produce on the screen a spike in the base line trace upon the occurrence at the probe of an ultrasonic pulse echo, slope signal generator means connected to the second deflecting means to produce a movable ultrasonic beam centerline trace forming on said viewing screen an angle with the base line trace related to said non-orthogonal angle and at a position intersecting the spike, frequency dividing means responsive to said timing pulse generator means and operative in synchronism therewith to energize said pulse producing means and the slope signal generator means to establish a time sequence between the production of the beam centerline trace and the excitation of the probe, and scale means positioned on said viewing screen and provided with a marking corresponding to a cross-section of said test body to indicate the intersection of the spike and beam centerline trace with respect thereto.

2. A material testing system according to claim 1 wherein said scale means comprises a transparent template.

3. A system as defined in claim 1, in which the time sequence established by the frequency dividing means provides alternate generation of the base line and beam centerline traces, and the slope signal generating means includes:
   a pulse generator connected to receive pulses from the frequency dividing means to generate a squarewave upon the occurrence of each thereof; and
   a slope generator responsive to the squarewave pulse to provide to the second deflecting means a deflection signal which positions the electron beam in the direction of the spike and varies linearly with time commencing with the end of the squarewave pulse.

4. A system as defined in claim 3, further comprising:
   means responsive to the position of the probe relative to the test body for varying the duration of the squarewave pulse, thereby to shift the position of the beam centerline trace in a direction parallel to the base line trace.

5. A material testing system for determining the location of internal defects in solid test bodies comprising:
   an ultrasonic wave probe engageable with the test body and directed to produce waves within the body at a given non-orthogonal angle relative to the wave-entrant surface of the body;
   means for repetitively energizing the probe to transmit an ultrasonic beam within the test body including repetition rate generator means;
   display means including a viewing screen and at least one beam forming a display on the screen;
   first defletcion means for periodically sweeping the beam in one direction across the screen in timed relation to energization of the ultrasonic probe to produce a base line trace;
   second deflection means for varying the position of the beam in a second direction generally normal to the one direction;
   slope signal generating means;
   means responsive to the repetition generator and connected to actuate the slope signal generating means in timed relation to energization of the probe;
   the slope signal generating means being coupled to the second deflection means to produce an ultrasonic beam centerline trace forming on said screen an angle relative to the base line trace representing the given angle of the ultrasonic beam centerline within the test body; and
   means responsive to an echo of the ultrasonic beam from a defect within the test body and coupled to the second deflection means to produce a sharp pulse deflection of the base line trace at a position, in the one direction, related to the position of the defect in a corresponding direction in the test body, the base line pulse deflection intersecting the beam centerline trace at a point from the base line trace corresponding to the location of the defect in the body in a direction normal to the corresponding direction.

6. A system as set forth in claim 5, further comprising:
   means responsive to the position of the probe relative to the test body for proportionately varying the position of the beam centerline trace in the one direction.

References Cited

UNITED STATES PATENTS

| | | | |
|---|---|---|---|
| 2,846,875 | 8/1958 | Grabendorfer | 73—67.8 |
| 3,178,933 | 4/1965 | Bloch et al. | 73—67.8 |

RICHARD C. QUEISSER, *Primary Examiner.*

J. BEAUCHAMP, *Assistant Examiner.*

UNITED STATES PATENT OFFICE
CERTIFICATE OF CORRECTION

Patent No. 3,395,572                          August 6, 1968

Neil A. Sinclair

It is certified that error appears in the above identified patent and that said Letters Patent are hereby corrected as shown below:

Column 3, line 31, for "marker" read -- marked --; line 75, for "770" read -- 70 --; column 4, line 73, strike out "from sweep generator 24 is swept horizontally across the" and insert the same after "pulse" in line 75, same column 4.

Signed and sealed this 15th day of July 1969.

(SEAL)
Attest:

Edward M. Fletcher, Jr.

Attesting Officer

WILLIAM E. SCHUYLER, JR.
Commissioner of Patents